C. F. ASPLUND.
SEED CORN SEPARATOR.
APPLICATION FILED APR. 24, 1907.

909,358.

Patented Jan. 12, 1909.

3 SHEETS—SHEET 1.

Witnesses:
L. L. Simpson
H. L. Dittbenner

Inventor:
Chas. F. Asplund

By his Attorneys:
Williamson Merchant

C. F. ASPLUND.
SEED CORN SEPARATOR.
APPLICATION FILED APR. 24, 1907.
909,358.
Patented Jan. 12, 1909.
3 SHEETS—SHEET 2.
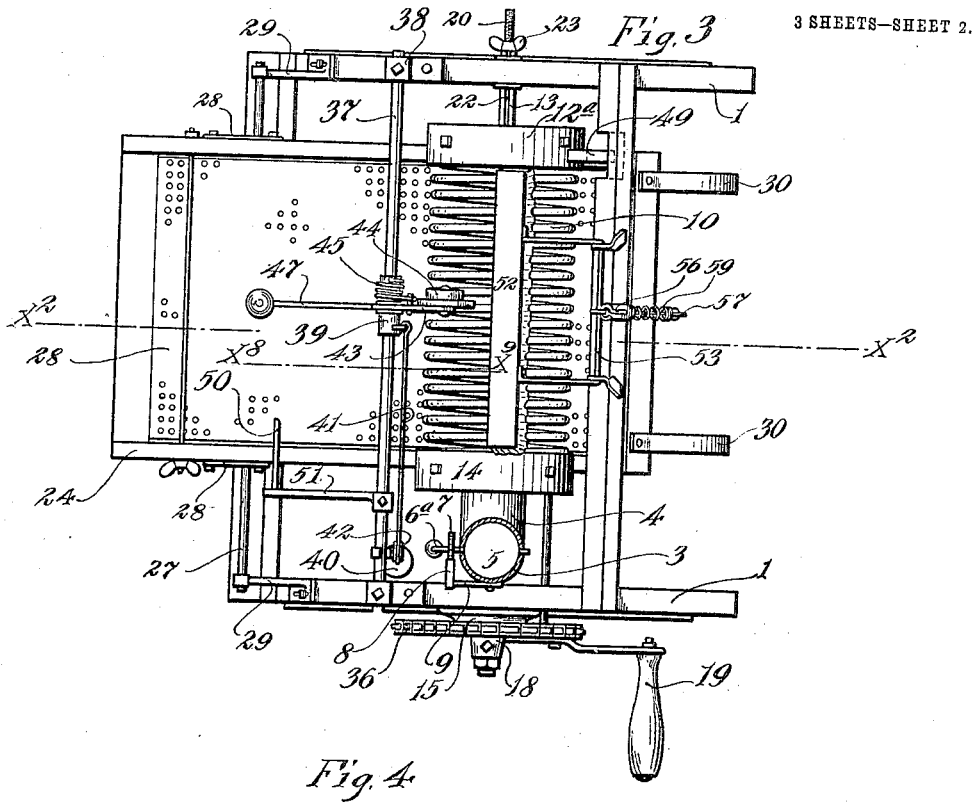
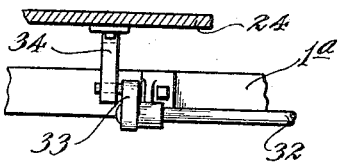
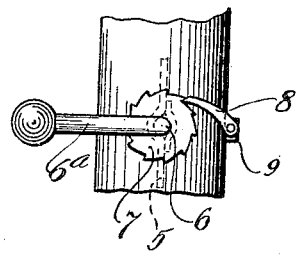
Witnesses:
L. L. Simpson
H. L. Dittbrenner
Inventor:
Chas. F. Asplund
By his Attorneys:
William Merchant

C. F. ASPLUND.
SEED CORN SEPARATOR.
APPLICATION FILED APR. 24, 1907.

909,358.

Patented Jan. 12, 1909.

3 SHEETS—SHEET 3.

Witnesses:
L. L. Simpson.
H. L. Dittbenner

Inventor:
Chas. F. Asplund
By his Attorneys:
Williamson Merchant

UNITED STATES PATENT OFFICE.

CHARLES F. ASPLUND, OF MINNEAPOLIS, MINNESOTA.

SEED-CORN SEPARATOR.

No. 909,358.  Specification of Letters Patent.  Patented Jan. 12, 1909.

Application filed April 24, 1907. Serial No. 370,020.

*To all whom it may concern:*

Be it known that I, CHARLES F. ASPLUND, a citizen of the United States, residing at Minneapolis, in the county of Hennepin and State of Minnesota, have invented certain new and useful Improvements in Seed-Corn Separators; and I do hereby declare the following to be a full, clear, and exact description of the invention, such as will enable others skilled in the art to which it appertains to make and use the same.

My invention has for its object to provide a seed corn separator of simplified construction and increased efficiency, and to the above ends the invention consists of the novel devices and combinations of devices hereinafter described and defined in the claims.

It is a well known fact that the kernels of corn that grow at or near the ends of the cob are thick and short and in many instances, are nearly spherical in form, although of irregular outline; and it is also known that the kernels that grow at the central and intermediate portions of the cob are quite flat and quite thin, but of much larger outline than those that grow near the end of the cob.

Scientific experiments have demonstrated that the large and flat kernels from the central portions of the cob, when used as seed, will produce a much better growth of corn than will the stubby kernels from the end portions of the cob, and that this is true both with respect to the quantity and the quality of the corn grown from such seed corn.

My improved machine was designed and operates to separate the large flat kernels of corn from all small kernels and from all thick or spherical and irregular kernels of corn.

The improved machine in its preferred form is illustrated in the accompanying drawings, wherein like characters indicate like parts throughout the several views.

Figures 1, 2:
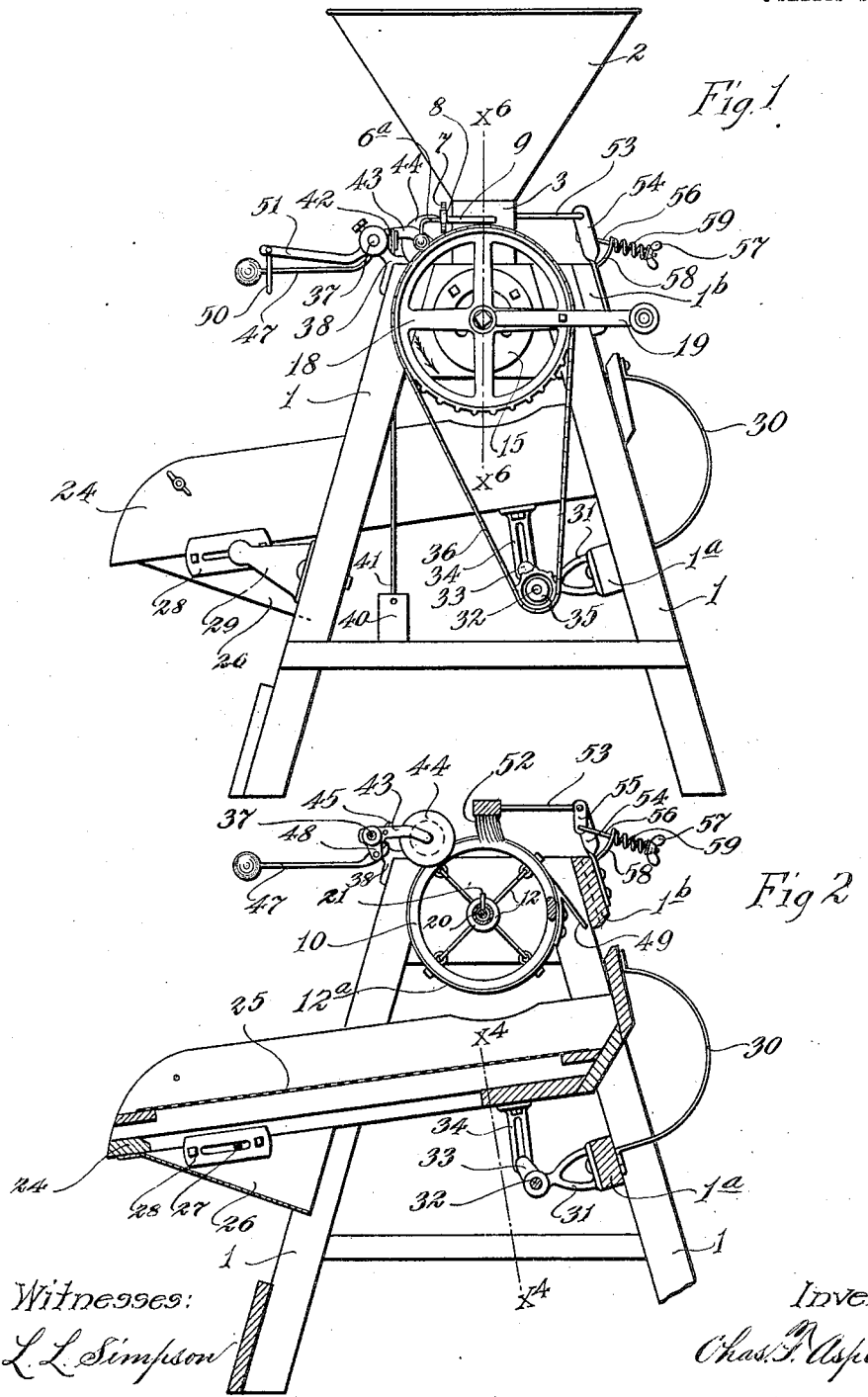
Figure 6:
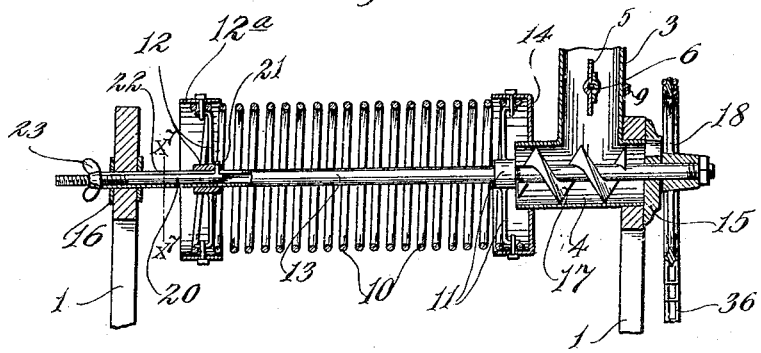
Figure 7:
Figure 8:
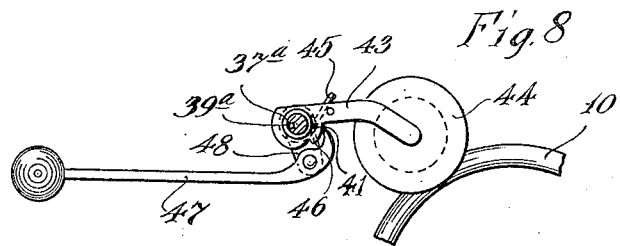
Figure 9:
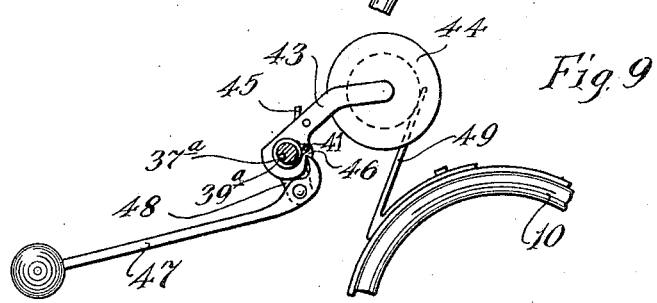

Figure 1 is a side elevation of the improved machine. Fig. 2 is a vertical section taken from front to rear through the machine on the line $x^2$—$x^2$ of Fig. 3. Fig. 3 is a plan view of the improved machine, with some parts sectioned. Fig. 4. is a detail in vertical section taken on the line $x^4$—$x^4$ of Fig. 2. Fig. 5 is a detail in front elevation, showing a portion of the feed device of the machine. Fig. 6 is a transverse vertical section taken approximately on the line $x^6$—$x^6$ of Fig. 1. Fig. 7 is a detail in section on the line $x^7$—$x^7$ of Fig. 6; and Figs. 8 and 9 are fragmentary views partly in diagram and partly in section on the line $x^8$ $x^9$ of Fig. 3.

All parts of the machine are mounted, directly or indirectly, upon a skeleton framework 1, which at the upper portion of one side, supports a supply hopper 2 having a depending spout 3 which, as shown, terminates in a horizontally extended delivery sleeve 4. In the hopper spout 3 is a damperlike feed valve 5, the stem 6 of which projects through said spout and at one end terminates in a weighted arm $6^a$. Secured to the valve stem 6, adjacent to the arm $6^a$, is a ratchet wheel 7 with which coöperates a lock dog 8 pivotally mounted, as shown, on an arm 9 secured to said spout. By means of the weighted arm and the pawl and ratchet described, the valve 5 is adapted to be set in different positions so as to give the desired feed of corn from the hopper to the separator presently to be described. This hopper and valve construction, while desirable, is not absolutely necessary to the main feature of my invention, which resides in the novel form of separator. The preferred form of this improved separator as illustrated in the drawings comprises a large coiled spring 10, one end of which is attached to a spider or radial armed head 11, and the other end of which is attached to a similar spider or radial armed head 12 having an external ring $12^a$. A tubular shaft 13 is extended axially through the spiral spring or separating coil 10 through the spiders 11 and 12 and through the delivery sleeve 4 of the feed hopper. The said spider 11 is rigidly secured to said shaft 13, while the spider 12 is free to slide thereon. A cylinder head 14 is rigidly secured to the spider 11 and to the adjacent end of the spring or spiral separator 10, and is provided with an axial perforation through which the delivery sleeve 4 projects, as best shown in Fig. 6. One end of the shaft 13 is journaled in a suitable bearing 15 secured on one side of the framework 1, while the other end thereof is journaled in a suitable bearing 16 on the other side of the said framework. Within the delivery sleeve 4, the shaft 13 is provided with a spiral conveyer 17, and just outward of the bearing 15 it is provided with a sprocket 18, which sprocket is shown as provided with an operating crank 19.

Working telescopically within the left hand end of the hollow shaft 13 (directions being taken with respect to Fig. 6) is an adjusting plunger 20 that is provided with a laterally projecting pin 21, which pin works through a slot 22 in said shaft and engages the hub of the spider 12. A thumb nut 23 works on the threaded idle end of the plunger or bolt 20, and by adjustments of this nut the separating spring or spiral 10 may be stretched so as to vary the space or distance between its coils. Preferably, this spring 10 is so wound that it will close up under its own tension.

Mounted to vibrate below the spiral separating drum or spring 10 is a sieve shoe 24 which carries a screen 25 and a backwardly inclined deflecting spout 26, which latter underlies the lower portion of said screen. The forward portion of this shoe is supported by a rod 27 that is passed through slotted guides 28 on the sides of said shoe and is secured at its ends to brackets 29 on the framework 1. The rear end of said shoe is supported by a pair of curved springs 30, the upper ends of which are securely attached to the back of said shoe and the lower ends of which are, as shown, attached to a transverse bar 1ª of the framework 1. Mounted in bearings 31, shown as secured to said bar 1ª, is a crank shaft 32 that is provided at one end with a crank arm 33, the pin of which works in a slotted bracket 34 secured to the bottom of the upper portion of the shoe 24. At its other end the crank shaft 32 is provided with a small sprocket 35 over which and the large sprocket 18 on the shaft 13, a sprocket chain 36 runs to impart a relatively high rotation to said crank shaft when the shaft 13 is rotated by means of the hand crank 19. The arrangement of the means described for supporting and vibrating the shoe 24 is such that under rotation of the crank shaft 32 and its crank 33, the pin of the latter acting on the slotted bracket 34 will oscillate the rear end of the shoe upward, downward, forward and rearward with irregular movement and with a jumping or jarring action which will keep the corn or material on the screen 25 jumping around upon the said screen. Also, under forward movement of the shoe, the rear extremities of the slotted guides 28 will strike the rod 27, causing the latter to operate as a slightly yielding stop which will jar the shoe of the screen endwise and dislodge any small particles of corn which may be caught or lodged in the meshes or openings of the said screen. The spring supports 30 tend to maintain the rear end of the shoe approximately in the position shown in Fig. 2.

As already indicated, the amount of corn that will be fed into the receiving end of the spiral separating drum or spring 10 may be regulated by the proper adjustment of the feed valve 5. The corn which will contain large, flat seeds from the central or intermediate portions of the cobs and round and comparatively thick or stubby kernels from the end portions of the cob, together with more or less broken corn and other broken grain and possibly some other foreign material of relatively small size, all commingled together, will be introduced into the receiving end of the said spiral separating drum or spring 10. As shown, the said spring 10 is wound with a left hand thread and, hence, should be rotated in the direction of the arrow marked on Fig. 1, under which direction of rotation the said spring will act as a spiral conveyer to force the material toward the discharging end of the said spring or spiral separating drum, and the round relatively thick kernels from the ends of the cobs will be discharged at the delivery end of said separating drum while the relatively flat kernels from the central portions of the cob will fall through the spiral space between the coils of the spring 10 (together with any small foreign material or broken kernels) onto the vibrating screen 25. The meshes of the screen 25 should be such that all such materials, except the flat kernels, will pass through the screen, while the large flat kernels will be discharged off from the delivery end of the said screen. Thus it will be seen that the large flat kernels which, as above stated, have been known to produce, when planted, the best grades of corn, are separated from all other materials with which they were before commingled.

In the action of the spiral separating drum or spring 10 great many kernels which are but a little too thick to pass between the coils will be lodged and quite tightly held between the said coils. To dislodge these kernels, I provide a so-called dislodging device, the preferred form of which will now be described. Extending parallel to the shaft 13 and to the axis of the spiral separating drum or spring 10 is a supporting rail in the form of a shaft 37 rigidly secured at its ends to bearings 38 on the upper portion of the framework 1. This shaft is provided with a long groove 37ª, and mounted to travel on the said rod or rail 37 is a carrier in the form of a sleeve 39 which is held against rotation by a key 39ª that works in the groove 37ª. This sleeve is under tension to move toward the receiving end of the separating coil 10, as shown, by means of a weight 40 attached to a cord 41 that runs over a guide sheave 42 mounted on the rod 37. Mounted to oscillate on the sleeve or carrier 39 is an arm 43 which, at its free end, carries a flanged dislodging wheel 44, the flange of which is adapted to run in the spiral space between the coils of the spring 10. A spring 45 shown as coiled around the sleeve 39 and attached to said sleeve at one end and to said arm 43 at its other end, yieldingly holds the flange of said wheel in working position between the coils of said spring 10, and the face of the said wheel against the outer portion of said spring 10. A weighted lock dog 47 is pivoted to a lug 48 of the sleeve 39, and its short end is adapted to engage with a shoulder or tooth 46 of the arm 43 when the latter is raised so as to carry the dislodging wheel 44 upward into an inoperative position, as shown in Fig. 9. The weighted end of the dog 47 is in the form of a long arm having a ball at its outer end, but it will, of course, be understood that a spring might be employed instead of a weight.

Under rotation of the separating coil or spring 10, the dislodging wheel 44 and, hence, the sleeve 39 and other parts carried thereby are caused to travel on the rod 37 toward the delivery end of the said coil 10; and when the said wheel reaches the limits of its travel in that direction a tripping arm or cam projection 49 carried by the annular ring 12ᵃ comes into contact with the face of the said wheel, and thereby raises the same into its inoperative position shown in Fig. 9, whereupon the dog 47 locks the same in such raised position. As soon as the arm 49 passes out of engagement with the said wheel 44, the weight 40 causes the sleeve 39 and parts carried thereby to move to its limit toward the receiving end of the coil 10, and as this limit of movement is reached the weighted end of the dog 47 is brought into engagement with and is raised by a forwardly inclined dog releasing cam 50, which as shown, is supported by an arm 51 rigidly secured to the rail 37. When the dog 47 is thus moved it releases the arm 43 and the spring 45 then throws the dislodging wheel 44 again into engagement with the receiving portion of the coil 10. It will thus be seen that the dislodging wheel 44 is caused to repeatedly travel in the spiral opening of the coil 10 and then to automatically return to normal position. Under the action of this dislodging wheel, all kernels which are caught or lodged between the coils of the spring or spiral separating drum 10 will be dislodged and forced back into the latter.

Working on top of the separating coil 10 is a stiff brush 52 which, as shown, is supported by a bail 53 pivotally mounted in bearings 54 on a transverse upper bar 1ᵇ of the frame 1. This bail, as shown, has a short depending arm 55 to which is attached an adjusting bolt 56 having a thumb nut 57 that works through a bracket 58 on the bar 1ᵇ. A coiled spring 59 compressed between the bracket 58 and the nut 57 assists gravity in holding the brush 52 against the upper surface of the coil 10. This brush 52 will serve to dislodge kernels that are only lightly caught in the opening of the coil 10.

It is evident that the width of the spiral opening of the separating coil 10 may be varied by adjustments of the rod 20 and its nut 23, which adjustments serve to stretch the said coil to a greater or less extent. Thus the separating coil may be graduated or adjusted for the selection of kernels of the desired thickness.

What I claim is:

1. In a separator of the kind described, the combination with a separating coil and means for rotating the same, of means for delivering material to be separated into one end of said coil, a traveling dislodging device arranged to work in the spiral space of said coil for the purpose of dislodging material lodged therein, and means for throwing said dislodging device out of action while it is making its return movement, substantially as described.

2. In a separator of the kind described, the combination with an approximately horizontal separating coil and means for rotating the same, of means for delivering material to be separated into one end of said coil, and a dislodging mechanism comprising a guide rail, an arm mounted to travel and oscillate on said rail, a wheel carried by said arm and working in the spiral space of said separating coil, under rotation of the latter, means for automatically throwing said wheel out of engagement with said coil at the delivery end thereof, means for automatically returning said wheel to the receiving end of said coil, and means for automatically re-engaging said wheel with said coil when it has been returned to the receiving end thereof, substantially as described.

In testimony whereof I affix my signature in presence of two witnesses.

CHARLES F. ASPLUND.

Witnesses:
MALIE HOEL,
F. D. MERCHANT.